United States Patent [19]

Shoesmith, Jr.

[11] 4,319,933
[45] Mar. 16, 1982

[54] BRIDGE AND DIE ATTACHMENT FOR CUTTING TORCHES

[76] Inventor: Rollo Shoesmith, Jr., 1101 E. Third St., Maryville, Mo. 64468

[21] Appl. No.: 189,761

[22] Filed: Sep. 23, 1980

[51] Int. Cl.³ .............................................. B23K 7/10
[52] U.S. Cl. .................................... 148/9 R; 266/58; 266/64; 266/70; 266/77
[58] Field of Search ...................... 266/58, 64, 66, 68, 266/70, 77; 148/9

[56] References Cited

U.S. PATENT DOCUMENTS

| 1,922,529 | 8/1933 | Day ......................................... 266/56 |
| 2,036,733 | 4/1936 | Kehl ....................................... 266/56 |
| 2,036,734 | 4/1936 | Kehl ....................................... 266/56 |
| 2,514,741 | 7/1950 | Bullman ................................. 266/58 |
| 2,740,621 | 4/1956 | Way, Jr. ................................. 266/72 |
| 3,614,078 | 10/1971 | Hepler ................................... 266/58 |
| 3,944,194 | 3/1976 | Robinson ............................... 266/64 |

Primary Examiner—W. Stallard
Attorney, Agent, or Firm—Lowe, Kokjer, Kircher, Wharton & Bowman

[57] ABSTRACT

An accessory for facilitating the accurate cutting of holes with a cutting torch. A die is attached to the workpiece by legs and presents a die opening which controls the size and shape of the hole. A bridge piece fits against the die and maintains the cutting torch tip perpendicular to the surface of the workpiece as the torch is guided around the edge of the die opening to form the hole.

9 Claims, 3 Drawing Figures

BRIDGE AND DIE ATTACHMENT FOR CUTTING TORCHES

BACKGROUND AND SUMMARY OF THE INVENTION

This invention relates to a bridge and die accessory which may be attached to a cutting torch to facilitate the accurate cutting of holes.

The need to accurately form holes in metal parts has led to the development of various types of guide devices which serve to properly guide the cutting torch during cutting of the hole. Such devices are characterized by undue cost and complexity and require a large number of parts which must be properly machined and assembled if they are to cooperate effectively with one another. In addition, the time required to set up and take down these complicated guide devices makes their use impractical in many situations. Still another problem is that many of the devices that have been proposed are suitable for use with only a single type and size of cutting torch. Equally significant, it is common for the torch guide to be arranged such that the torch forms the rough starting cut at the edge of the finished hole. Consequently, the finished hole has a rough area on its edge which must subsequently be treated in order to make it smooth, thus further increasing the time and labor costs.

The present invention is aimed at eliminating these problems and has, as its principal object, the provision of a simple and economical attachment for a cutting torch which assists in accurately cutting holes in metal parts.

Another object of the invention is to provide a method of using and guiding a cutting torch in a manner to quickly and accurately cut holes having uniformly smooth edges.

An additional object of the invention is to provide a cutting torch attachment which may be applied to and removed from the workpiece in a quick and simple manner.

Yet another object of the invention is to provide a cutting torch attachment which is constructed to accomodate various types and sizes of cutting torches. It is important in this respect that the various components of the torch attachment are interchangeable. The legs which attach to the die are removable, and legs having various lengths can thus be used with a single die, as can bridges of different sizes.

A further object of the invention is to provide a cutting torch attachment and method wherein the tip of the cutting torch is maintained in a stable position perpendicular to the workpiece in order to assure accuracy in the cutting operation.

Still another object of the invention is to provide a cutting torch attachment and method wherein the visibility of the work is not significantly impaired. Good visibility of the workpiece is assured due to the radial spokes of the bridge member which provide visual access to the die opening and the tip of the torch.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views.

Figure 1:
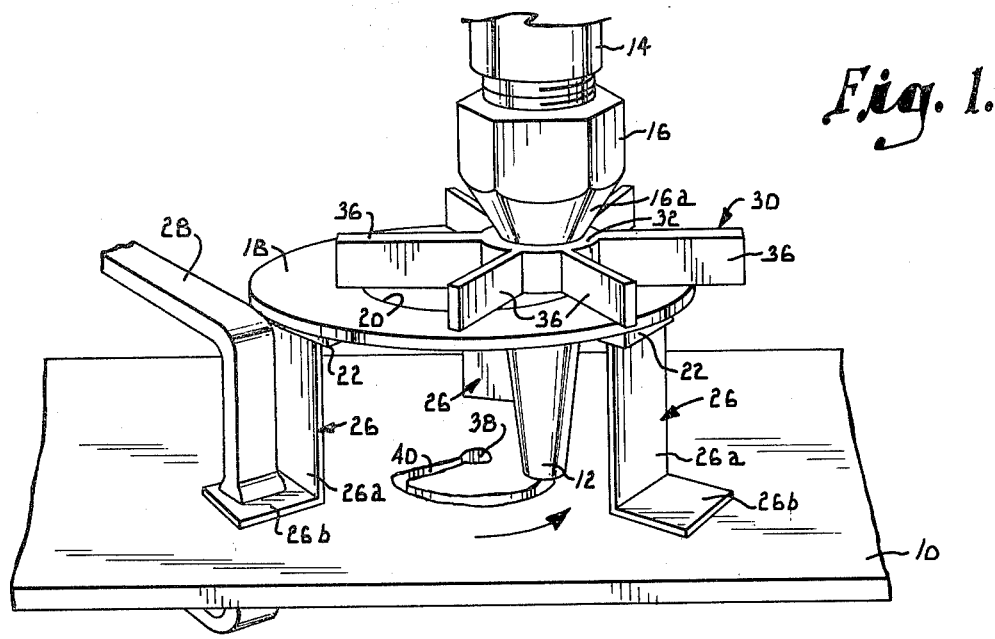
FIG. 1 is a perspective view of a bridge and die attachment applied to a cutting torch in accordance with a preferred form of the present invention, the cutting torch being shown only fragmentarily.
Figure 2:
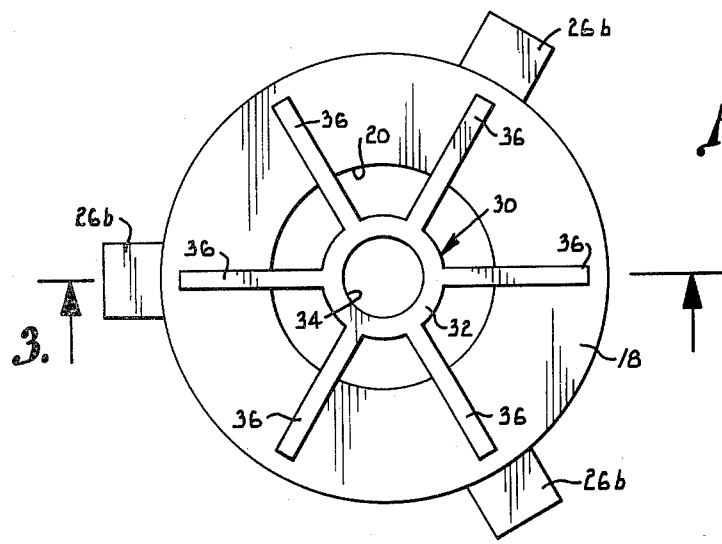
FIG. 2 is a top plan view of the bridge and die attachment shown in FIG. 1.

Referring initially to FIG. 1, numeral 10 designates a metal plate in which a hole is to be cut with a conventional cutting torch. The torch includes the usual tapered tip 12 which is secured to the torch head 14 by a nut 16 having a tapered surface 16a. The cutting torch may be a hand operated unit having apertures in the end of tip 12 for directing a flame against the work.

Figure 3:
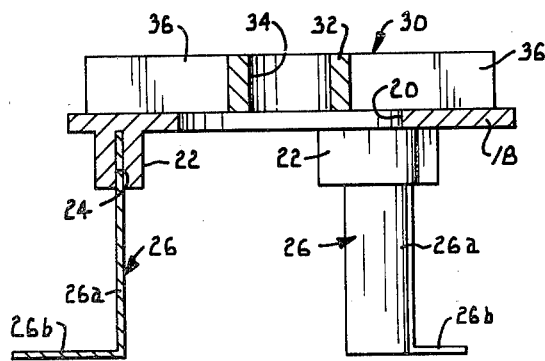
FIG. 3 is a sectional view taken generally along line 3—3 of FIG. 2 in the direction of the arrows.

In accordance with the present invention, a circular die 18 is provided with an opening or hole 20 having the same shape as the hole which is to be cut in plate 10 with the cutting torch. The die opening 20 is slightly larger than the hole which is to be cut, with the exact size of the die opening depending on the torch used to cut the hole. In the illustrated form of the invention, the hole which is to be cut is circular and hole 20 is thus circular and is formed in the center of die 18. Die 18 has three integral bosses 22 formed on its lower surface outwardly of the central opening 20. Bosses 22 are spaced equidistantly from one another around the annular portion of the die, and each boss 22 has a thin slot 24 (see FIG. 3) extending into its bottom surface.

Die 18 is spaced away from plate 10 by three legs 26. Each leg 26 has a straight vertical portion 26a and a flat foot 26b on the lower end of the leg. The upper end of each leg 26 fits closely but removably in the slot 24 of the corresponding boss, while the foot 26b is adapted to lie flatly against the upper surface of plate 10. The feet 26b point outwardly or away from die 18 to receive a clamp 28 that may be used to clamp one or more of the legs to plate 10. In this manner, die 18 is held at the proper location with its hole 20 centered above the hole which is to be cut in the work.

The cutting torch attachment also includes a bridge member 30. The bridge member is somewhat thicker than die 18 and includes a central circular hub 32 having a hole or aperture 34 at its center. Aperture 34 is circular and is large enough to receive the torch tip 12 in extension through it. Aperture 34 is smaller than the body of nut 16 and also smaller than the hole 20 in die 18. Projecting radially outwardly from hub 32 are six spokes 36. The diameter of hub 32 plus the length of each spoke 36 is greater than the diameter of hole 20. Therefore, bridge 30 is able to span or bridge hole 20 at all times and particularly when the edge of aperture 34 is aligned with the edge of hole 20 during the cutting operation, as will be more fully explained. The spokes 36 are spaced equidistantly around hub 32. Bridge 30 has a smooth bottom surface which is able to easily slide on the smooth upper surface of die 18.

In a preferred form of the invention, die 18 and bridge 30 are formed from a high heat resistant resin. The legs 26 are constructed of stainless steel sheet metal. Alternatively, the die and bridge members can be formed from stamped stainless steel sheet metal if the attachment is to be used for industrial or military applications.

In use, the ends of legs 26 opposite the feet 26b are inserted into slots 24 of bosses 22 with feet 26b pointing outwardly. The feet are then applied to the upper surface of plate 10 in order to properly locate opening 20 above the hole which is to be cut in the plate. Clamp 28 or a similar fastening device is applied to one or more of the feet 26b in order to secure the die in the proper position.

Bridge 30 is inserted on tip 12 of the cutting torch and is seated against the tapered surface 16a of nut 16. After the cutting torch has been lit and the flame regulated for the thickness of plate 10, its tip 12 is inserted through the center of hole 20 in the cutting die until bridge 30 contacts the smooth upper surface of the die. The tip of the cutting torch is then located adjacent plate 10 at the center of the hole to be cut, and a small starting hole 38 is cut through the plate. Any slag which builds up when the starting hole is cut is preferably chipped off to prevent the torch tip from dragging on it.

After the starting hole has been cut, the torch is moved outwardly with bridge 30 resting squarely on the upper surface of die 18. This forms a generally straight cut 40 extending from starting hole 38 to the edge of the hole that is to be cut in plate 10. When the side of tip 12 of the torch contacts the edge of the die hole 20, the torch is thereafter moved around the edge of the opening with bridge 30 remaining square against the cutting die and light pressure applied to maintain the torch tip against the edge of hole 20. A smooth cutting motion using the outer edge of the die opening as a guide surface results in a hole being cut in plate 10 of the proper size and shape corresponding to the die opening 20. It is pointed out that the rough starting cut is formed in the center of the piece that is cut away from plate 10 so that the edge of the hole is smooth and does not present any rough areas as would occur if the rough starting cut were made adjacent the edge of the hole.

The bridge 30 maintains the axis of tip 12 perpendicular to the upper surface of plate 10 during the cutting operation, while the spokes 36 stabilize the tip of the torch as it is moved around the edge of the die opening. Since the bridge is constructed to span opening 20 at all positions of the bridge, the stability and accuracy of the cutting operation are enhanced. The arrangement of spokes 36 is such that they provide good visibility of the tip 12 and the hole that is being cut out. The die opening 20 controls the size and shape of the finished hole, while the die provides a smooth, wide surface upon which the bridge slides during cutting of the hole.

The legs 26 maintain the torch tip the proper distance from plate 10, while the feet 26b provide clamp surfaces for securing the assembled legs and die to the plate. Legs having different lengths can be employed with torches having lengths of various sizes, while different bridges can be used with different sizes and styles of cutting torches.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. Apparatus for use with a cutting torch to facilitate cutting a hole in a workpiece, said apparatus comprising:
    a die member having an opening therein shaped substantially in conformity with the hole to be cut in the workpiece;
    leg means for spacing said die member a preselected distance from workpiece; and
    a bridge member presenting an aperture therein sized to closely receive a tip portion of the cutting torch, said bridge member being adapted to be applied to a side of the die member remote from the workpiece and having a lateral dimension great enough to span the opening in said die member,
    whereby the tip portion of the torch can be extended through said aperture and through said opening and guided around the edge of said opening during cutting of the hole in the workpiece.

2. Apparatus as set forth in claim 1, wherein said leg means comprises a plurality of legs each having one end adapted for releasable connection with said die member and an opposite end engageable with the workpiece, thereby to space the die member away from the workpiece a distance substantially equal to the length dimension of the legs between said ends thereof.

3. Apparatus as set forth in claim 2, including a foot portion on said opposite end of each leg adapted to lie flatly on the workpiece to permit clamping of the foot portion to the workpiece.

4. Apparatus as set forth in claim 2, including a plurality of slots in said die member, each slot being sized to closely receive said one end of the corresponding leg to thereby releasably connect the leg to the die member.

5. Apparatus as set forth in claim 2, including:
    a plurality of bosses on said die member located outwardly of said opening; and
    a slot presented in each boss adapted to closely receive said one end of the corresponding leg to thereby releasably connect the leg to the die member.

6. Apparatus as set forth in claim 1, wherein said bridge member includes:
    a central hub portion having said aperture formed therein; and
    a plurality of spaced apart spokes extending generally radially from said hub portion, said hub portion having a diameter which when added to the length dimension of each spoke is greater than the lateral dimension of said opening in the die member.

7. Apparatus as set forth in claim 6, wherein said spokes are spaced apart from one another substantially equidistantly around said hub portion.

8. A method of cutting a hole in a workpiece with a cutting torch, said method comprising the steps of:
    providing a die member having an opening therein substantially conforming in size and shape to the hole to be cut in the workpiece;
    spacing the die member a preselected distance away from the workpiece;
    providing a bridge member having a central aperture and a lateral dimension great enough to span the opening in the die member;
    extending a tip portion of the cutting torch through said aperture in the bridge member until the torch engages the bridge member to control the distance the tip portion extends beyond the bridge member;

applying the bridge member to the die member in a manner to extend the tip portion of the torch through said opening and into proximity to the workpiece;

cutting a starting hole in the workpiece with the tip portion of the torch at a location spaced inwardly of the edge of the final hole which is to be cut in the workpiece;

moving the torch generally outwardly from the starting hole while continuing to cut through the workpiece until the torch engages the edge of the opening in the die member; and moving the torch around the edge of the opening while continuing to cut through the workpiece.

9. A method as set forth in claim 8, wherein said spacing step comprises attaching a plurality of legs to the die member at one end and to the workpiece at the other end to space the die member from the workpiece a preselected distance corresponding to the length dimension of each leg.

* * * * *